E. H. RUNDLE.
AUTOMOBILE WHEEL.
APPLICATION FILED SEPT. 16, 1913.
1,170,937.
Patented Feb. 8, 1916.
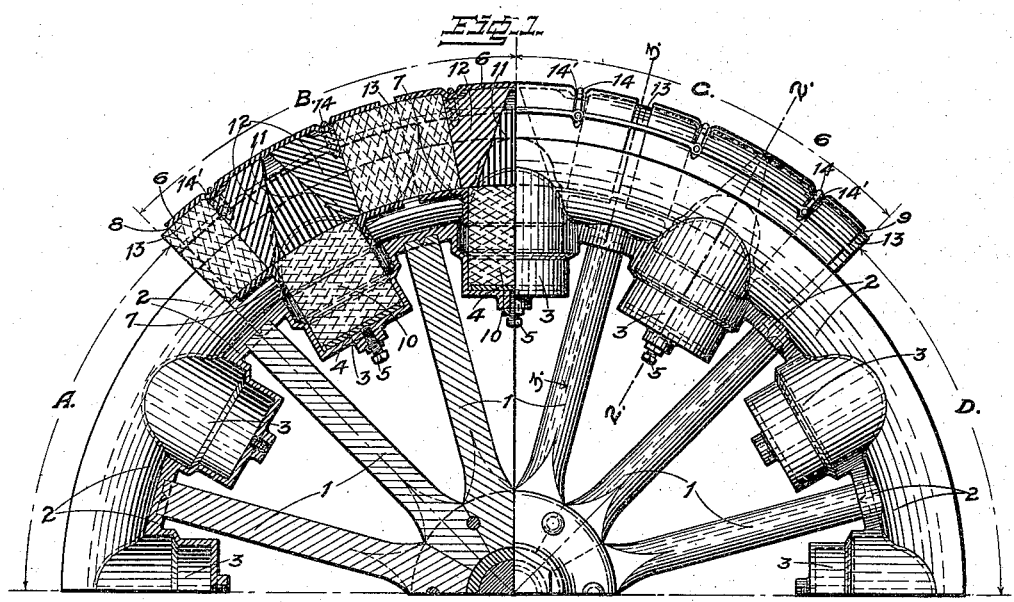
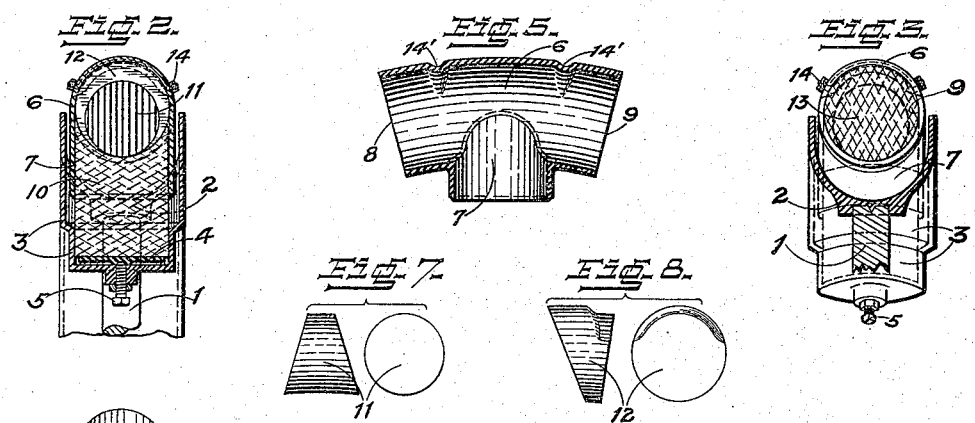
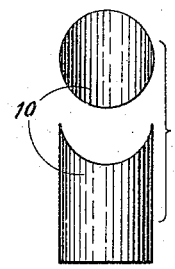
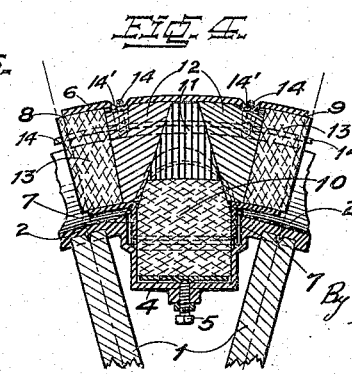
Witnesses
Lola Tembey
Hugo E. Frey
Inventor
Edward H. Rundle
By Claude C. Coffin
Attorney
THE COLUMBIA PLANOGRAPH CO., WASHINGTON, D. C.

UNITED STATES PATENT OFFICE.

EDWARD H. RUNDLE, OF LONGMONT, COLORADO.

AUTOMOBILE-WHEEL.

1,170,937.  Specification of Letters Patent.  Patented Feb. 8, 1916.

Application filed September 16, 1913.  Serial No. 790,004.

*To all whom it may concern:*

Be it known that I, EDWARD H. RUNDLE, a citizen of the United States, residing at Longmont, in the county of Boulder and State of Colorado, have invented new and useful Improvements in Automobile-Wheels, of which the following is a specification.

My invention relates to improvements in the rim and tire of an automobile wheel, and the object of my improvement is to provide a cushion tire which will be durable and in operation have as near as may be the spring effect of a pneumatic rubber tire and be less expensive, need less attention and care, and of longer life than the ordinary rubber pneumatic tires in general use on automobiles.

In general the invention consists of a wheel built in such manner that the tire is made up of segments some of which are hard non-elastic and the others of elastic, compressible material, so arranged that compression upon any portion of the wheel rim will be distributed throughout the circumference of the tire similar to the cushion provided by an inflated pneumatic tire.

In the drawings the same letters and figures of reference indicate corresponding parts in the different figures.

Figure 1 is a semi-circular detail of a part of the assembled construction on a motor wheel. The right half of this figure is shown in full figure front elevation, and the left half is shown in section on the central vertical plane of the construction. The parts embraced within the sectors "A" and "D" show details of the wheel rim only, and the parts embraced within the sectors "B" and "C" illustrate details of the tire and the assembled construction, shown in the expanded position. Fig. 2 is a cross-section of the rim and tire, taken on line 2—2 of Fig. 1 through the central radial plane of one of the rim cylinders. Fig. 3 is a similar cross-section taken on line 3—3 of Fig. 1 on an extended central radial plane of one of the spokes. Fig. 4 is a sector detail on central vertical section showing the assembled construction in compressed position. Fig. 5 is a detail in central vertical section of the T-shaped tubular housing member. Fig. 6 comprises a top-plan and side-elevation of one elastic expanding member. Fig. 7 comprises side and end elevation of one expanding wedge member. Fig. 8 comprises side and end elevation of one compressing wedge member. Fig. 9 comprises side and end elevation of one elastic compressing member.

Number 1 is a wheel frame of ordinary wood spokes or other suitable construction.

2 is the wheel rim of special construction, being approximately semi-circular in cross-section as shown in Fig. 3, and having rim cylinders or cups extending inward radially from the circumference of the rim between the spokes of the wheel; these cylinders or cups are shown at 3. Inside cups 3 are adjustable disks or movable bottoms 4 which can be moved inward or outward to proper adjustment by set-screws 5.

The portion of the construction thus far described and represented by numerals from 1 to 5 constitutes the wheel without a tire. The part now to be described constitutes my special composite cushion tire which corresponds to the ordinary pneumatic wheel tire. The wheel rim may be constructed of pressed steel or other suitable material and may be constructed in one continuous piece or made in segments to be joined together in assembling the wheel.

The wheel tire consists generally of a series of T shaped tubular housing members 6 made to rest in the hollow or groove of the rim with the base of the T shaped members extending radially into the cups 3 and the outside of the cross arm of the T members form the outer circumference and tread of the wheel.

6 is a T shaped tubular housing member of suitable metallic construction with curved top or cross arm open at its ends 8 and 9. The base 7 of the T is cylindrical and made to fit loosely in the upper or expanded portion of cups 3 of the rim.

10, which I designate an expanding block is a cylindrical block of rubber or other compressible material with plane bottom and curved top as shown in Fig. 6, made to fit into cylinder 7 of member 6 and extending beyond part 7 to fit into the reduced portion of cup 3 and rest upon the adjustable bottom 4. Inside of housing member 6 and resting on the top or curved end of expanding block 10 is a hard wedge shaped block 11 of wood, fiber, or aluminum or other suitable material. This block has a circular cross-section and is of less diameter than that of the top or cross arm of member 6 to allow movement of the wedge 11. On each side of wedge 11 and inside member 6 are hard blocks 12 of wood or other suitable material with beveled ends pressed against wedge 11; the outer ends of blocks 12 are plane surfaces parallel to the radii of the wheel.

13 are curved cylindrical connecting blocks of rubber or other compressible material made to fit into the ends 8 and 9 of members 6 and are pressed against blocks 12. Blocks 13 are made of sufficient length to extend from a block 12 in one member 6 out through opening 8 or 9 and into the adjoining member 6 along the tire and against block 12 in the adjoining member. In the assembled position there is a clearance between end 8 of one member 6 and end 9 of the adjoining member to allow proper operation as hereinafter indicated.

On the outside periphery of the wheel is a continuous chain 14 which holds the assembled tire together and in place. Chain 14 is indicated in the drawings to consist of links on each side of the tire joined by cross ties at their joints, the cross ties passing over the tread of the tire through grooves 14' shaped into members 6. Blocks 12 are properly grooved or beveled as shown in Fig. 8 to allow their proper movement past the depressions inside member 6 caused by the grooves 14'. It is obvious that chain 14 may be constructed as an open link chain or other construction as may be best suited for the particular wheel and tire designed.

In operation when there is no pressure of load upon any portion of the wheel tire the T shaped tubular housing members 6 are held out against the chain 14 and away from the base of the groove of the wheel rim by the elastic expanding blocks 10 resting against the movable bottoms of cups 3, as shown in sectors "B" and "C" of Fig. 1. As the wheel turns and any one or two T members 6 rest upon the ground and bear the load the T members are pressed inward against expanding block 10 which holds and forces expanding wedge member 11 outward between the compressing wedge members 12 spreading the two blocks 12 which in turn compress the adjoining elastic connecting blocks 13 which transmit the force of impact and pressure of the load along the circumference of the entire wheel and out against the binding chain 14 thus giving approximately the action of a pneumatic tire. Fig. 4 indicates the position of parts in compressed position when the weight or load rests upon the segment shown in the figure.

I claim:

1. A wheel tire consisting of a series of tubular segments joined into a substantially continuous tire by elastic connecting blocks extending into adjacent open ends of said segments, each of said segments having an opening in its base with an elastic expanding block adapted to rest upon a wheel rim and extend into said tubular segment through said opening, with a non-elastic wedge inside said tubular segment adapted to spread said elastic connecting blocks when pressed by said elastic expanding block, substantially as described.

2. In a wheel the combination of a grooved rim, a tire consisting of alternating elastic and non-elastic blocks, said non-elastic blocks being wedge shaped and adapted to wedge between said elastic blocks and spread said elastic blocks when pressed outward from said wheel rim, with elastic blocks between said wedges and said wheel rim, and means to hold said tire in assembled position, substantially as described.

3. The combination in a wheel of a grooved rim having cups extending inward radially between the spokes of the wheel with a tire consisting of a series of T shaped tubular members, said T shaped members having their bases extending into said cups, elastic blocks extending into the bases of said T shaped members and resting on the bottoms of said cups, elastic blocks extending into the ends of said T shaped members and a flexible chain extending around the outer periphery of said tire.

4. In a wheel the combination of a tire consisting of a series of T shaped tubular segments, each of said segments having in its base and extending out therefrom an elastic block adapted to rest upon the rim of the wheel, an expanding wedge member above said block with two compressing wedge members resting against said expanding wedge member inside said tubular segment, elastic blocks resting against the outer ends of said expanding wedge members and extending out of the ends of said tubular T segment and into the adjoining T segments of the tire, with a flexible chain binding said segments together, substantially as described.

5. In a wheel the combination of a grooved rim with cups extending inwardly from said rim between the spokes of the wheel, with a tire consisting of T shaped tubular segments, the base of each segment adapted to extend into a cup in said rim, elastic expanding blocks adapted to fit into said cups and extend outward into the base of said T shaped segments, movable bottoms in said cups adapted to be adjusted by set screws in said cups, expanding wedge members in said T segments resting upon said elastic expanding blocks, compressing wedge members in said T segments at each side of said expanding wedge members, elastic connecting blocks resting against the outer ends of said compressing wedge members and extending out the ends of said T member segments and into the adjoining segments, with a flexible chain binding said segments in the groove of said wheel rim, substantially as described.

EDWARD H. RUNDLE.

Witnesses:
J. O. BISHOP,
RAY RAPP.